(12) United States Patent
Tabata et al.

(10) Patent No.: US 8,986,590 B2
(45) Date of Patent: Mar. 24, 2015

(54) POLYMER ARTICLE AND METHOD FOR PRODUCING POLYMER ARTICLE

(75) Inventors: Hironori Tabata, Shimamoto-cho (JP);
Hiroyuki Hirano, Shimamoto-cho (JP);
Kazuho Uchida, Shimamoto-cho (JP);
Akira Nakasuga, Shimamoto-cho (JP)

(73) Assignee: Sekisui Chemical Co., Ltd., Osaka (JP)

( * ) Notice: Subject to any disclaimer, the term of this patent is extended or adjusted under 35 U.S.C. 154(b) by 75 days.

(21) Appl. No.: 13/643,544

(22) PCT Filed: May 24, 2011

(86) PCT No.: PCT/JP2011/061827
§ 371 (c)(1),
(2), (4) Date: Oct. 25, 2012

(87) PCT Pub. No.: WO2012/008223
PCT Pub. Date: Jan. 19, 2012

(65) Prior Publication Data
US 2013/0041124 A1    Feb. 14, 2013

(30) Foreign Application Priority Data

Jul. 16, 2010 (JP) ................. 2010-162009
Dec. 10, 2010 (JP) ................. 2010-275778
Dec. 13, 2010 (JP) ................. 2010-276787

(51) Int. Cl.
*B29C 43/02* (2006.01)
*B29C 43/00* (2006.01)
(Continued)

(52) U.S. Cl.
CPC ............ *B29C 43/003* (2013.01); *B29C 43/02* (2013.01); *B29C 43/52* (2013.01); *B29C 47/003* (2013.01); *B29C 47/0033* (2013.01); *B29C 47/0019* (2013.01); *B29C 47/004* (2013.01)
USPC ............ 264/319; 264/320; 264/322; 526/72; 526/351; 528/502 R; 528/502 C; 528/503

(58) Field of Classification Search
CPC .. B29C 43/00; B29C 43/003; B29C 43/0033; B29C 43/02; B29C 43/52; B29C 47/004; B29C 47/0019
USPC ............ 526/72, 351; 264/19, 239, 322, 319, 264/320; 528/480, 502 R, 502 C, 503
See application file for complete search history.

(56) References Cited

U.S. PATENT DOCUMENTS 5,200,131 A    4/1993   Asanuma et al.
5,260,395 A    11/1993  Asanuma et al.
(Continued)

FOREIGN PATENT DOCUMENTS

CA    2040008 A1    10/1991
CA    2181423 A1    1/1997
(Continued)

OTHER PUBLICATIONS

International Search Report for the Application No. PCT/JP2011/061827 mailed Aug. 30, 2011.
(Continued)

*Primary Examiner* — Frances Tischler
(74) *Attorney, Agent, or Firm* — Cheng Law Group, PLLC (57) ABSTRACT

Provided are a polymer article excellent in mechanical strength, toughness, and stretchability and a production method of the polymer article. The polymer article of the present invention is formed of a polymer material and is a polymer blank or a formed polymer body. The polymer article of the present invention has a crystallinity of not less than 50% but less than 90% and a tensile strain at fracture of not less than 60%. A method for producing a polymer article of the present invention includes: a heating step of heating the polymer material to a temperature of not lower than (Tm−70)° C. but lower than Tm(° C.) where Tm is the melting point (° C.) of the polymer material; and a compression step of cooling the polymer material heated in the heating step and compressing the polymer material in the course of the cooling to obtain a polymer article having a crystallinity of not less than 50% but less than 90% and a tensile strain at fracture of not less than 60%.

14 Claims, 3 Drawing Sheets

(51) Int. Cl.
  *B29C 43/52* (2006.01)
  *B29C 47/00* (2006.01)

(56) References Cited

U.S. PATENT DOCUMENTS

| 5,882,518 | A  | 3/1999  | Yagi et al. |
| 5,968,994 | A  | 10/1999 | Hashimoto et al. |
| 2005/0182233 | A1 | 8/2005  | Weinhold et al. |
| 2009/0249883 | A1 | 10/2009 | Hikosaka et al. |

FOREIGN PATENT DOCUMENTS

| CA | 2203734    | A1 | 10/1997 |
| CN | 1914015    | A  | 2/2007  |
| EP | 0 451 743  | A2 | 10/1991 |
| EP | 0 754 719  | A2 | 1/1997  |
| EP | 0 803 341  | A2 | 10/1997 |
| GB | 885089     | *  | 12/1961 |
| JP | 63-191616  | A  | 8/1988  |
| JP | 63-194918  | A  | 8/1988  |
| JP | 4-94917    | A  | 3/1992  |
| JP | 5-278142   | A  | 10/1993 |
| JP | 10-7832    | A  | 1/1998  |
| JP | 10-306168  | A  | 11/1998 |
| JP | 2003-525778| A  | 9/2003  |
| JP | 2007-314645| A  | 12/2007 |
| WO | WO-01/66327| A2 | 9/2001  |
| WO | WO-2007/026832 | A1 | 3/2007 |

OTHER PUBLICATIONS

International Preliminary Report on Patentability for Application No. PCT/JP2011/061827 mailed Feb. 21, 2013.

The First Office Action for the Application No. 201180034796.7 from The State Intellectual Property Office of the People's Repubiic of China dated May 21, 2014.

* cited by examiner

POLYMER ARTICLE AND METHOD FOR PRODUCING POLYMER ARTICLE

TECHNICAL FIELD

This invention relates to a polymer article which is formed by heating and compression of a polymer material and is a polymer blank or a formed polymer body, and particularly relates to a polymer article excellent in mechanical strength, toughness, stretchability, and preferably thermal resistance and a method for producing the polymer article.

BACKGROUND ART

Polyethylene and polypropylene are called commodity plastics. Polyethylene and polypropylene are very inexpensive, good in formability, and lightweight because they have a specific gravity of 1.0 or less. Therefore, the commodity plastics are widely used for housings such as in home electric appliances, information equipment including personal computers, and office automation equipment, interior automotive trim, and the like.

However, the commodity plastics have low mechanical strength, low toughness, and low stretchability. For these reasons, it is generally difficult to use the commodity plastics as alternative materials for metallic materials, for example.

A typical method for increasing the toughness and stretchability of such a commodity plastic is to blend a rubber material into the commodity plastic. This method, however, presents a problem in that it causes a significant reduction in mechanical strength. In addition, this method also presents a problem in that it has difficulties in blending a rubber-based material into a commodity plastic to disperse it well in the commodity plastic.

In the meantime, in order to improve the mechanical strength and other properties of a commodity plastic to use as an alternative material for a metallic material, it can be considered to orient molecules of the commodity plastic or increase the proportion of crystals.

Patent Literature 1 described below discloses, for the purpose of increasing the mechanical strength of a commodity plastic, a method for producing a polymer oriented crystalline body including: an oriented melt formation step of stretching a melt of polymer, such as polyethylene or polypropylene, at a strain rate not lower than a critical stretching strain rate to put the polymer melt into an oriented melt state; and a quenching crystallization step of cooling the polymer melt while maintaining it in an oriented melt state, thereby crystallizing it. In this case, in order to obtain a polymer melt, the polymer is heated at a temperature not lower than the melting point of the polymer. In this production method, the crystallinity of the polymer can be relatively high.

CITATION LIST

Patent Literature

Patent Literature 1: WO2007/026832A1

SUMMARY OF INVENTION

Technical Problem

In the production method according to Patent Literature 1, the crystallinity of the resultant polymer oriented crystalline body becomes relatively high, so that the mechanical strength of the resultant polymer oriented crystalline body also becomes high. Meanwhile, the polymer oriented crystalline body, depending upon the intended use, may be desired to not only have high mechanical strength but also excellent toughness, stretchability, and thermal resistance.

Recently, development of novel commodity plastic materials is being considered. The development of commodity plastics having not only high mechanical strength but also excellent toughness, stretchability, and thermal resistance will increase the convenience of commodity plastics and further expand the applications of commodity plastics.

An object of the present invention is to provide a polymer article excellent in toughness and stretchability and a production method of the polymer article.

Another object of the present invention is to provide a polymer article excellent in toughness, stretchability, and thermal resistance and a production method of the same.

Solution to Problem

A broad aspect of the present invention provides a polymer article which is formed by heating and compressing a polymer material and is a polymer blank or a formed polymer body, wherein the polymer article has a crystallinity of not less than 50% but less than 90% and a tensile strain at fracture of not less than 60%.

In a specific aspect of the present invention, the melting point of the polymer article is the melting point of the polymer material plus 5° C. or above. Therefore, a polymer article having excellent thermal resistance can be provided.

In another specific aspect of the polymer article of the present invention, the polymer article is formed of polyolefin resin and is a polyolefin blank or a formed polyolefin body.

In another specific aspect of the polymer article of the present invention, the polymer article of the present invention is formed of polypropylene resin and is a polypropylene blank or a formed polypropylene body.

Another broad aspect of the present invention provides a method for producing a polymer article, which is a polymer blank or a formed polymer body, using a polymer material, the method including: a heating step of heating the polymer material to a temperature of not lower than (Tm−70)° C. but lower than (Tm)° C. where Tm is the melting point (° C.) of the polymer material; and a compression step of cooling the polymer material heated in the heating step and compressing the polymer material in the course of the cooling to obtain a polymer article having a crystallinity of not less than 50% but less than 90% and a tensile strain at fracture of not less than 60%.

In a specific aspect of the method for producing a polymer article of the present invention, in the heating step the polymer material is heated to a temperature of not lower than (Tm−15)° C. but lower than (Tm−5)° C., and in the compression step a polymer article is obtained which has a crystallinity of not less than 50% but less than 90%, a tensile strain at fracture of not less than 60%, and a melting point not lower than the melting point of the polymer material plus 5° C. Therefore, a polymer article can be provided which is excellent not only in mechanical strength, toughness, and stretchability but also in thermal resistance.

In a specific aspect of the method for producing a polymer article of the present invention, polyolefin resin is used as the polymer material to produce a polymer article which is a polyolefin blank or a formed polyolefin body.

In another specific aspect of the method for producing a polymer article of the present invention, polypropylene resin is used as the polymer material to produce a polymer article which is a polypropylene blank or a formed polypropylene body.

In still another specific aspect of the method for producing a polymer article of the present invention, in the compression step the polymer material is compressed so that the ratio of the difference between the thickness T2 (mm) of the polymer article obtained after the compression and the thickness T1 (mm) of the polymer material before the compression to the thickness T1 ((T1−T2)/T1) (compressibility) is 0.5 to 0.98, both inclusive.

In still another specific aspect of the method for producing the polymer article of the present invention, in the course of the cooling during the compression step, the polymer material is compressed at a temperature of 110° C. or above. Thus, the mechanical strength, toughness, and stretchability can be further increased.

Furthermore, in still another specific aspect of the method for producing the polymer article of the present invention, a sheet which has a projecting portion made of a polymer material is prepared as the polymer material, the sheet which has projecting portions including a sheet body and a projection formed on one side of the sheet body, and a polymer sheet is obtained as the polymer article by heating the sheet which has a projecting portion in the heating step and then rolling the sheet which has a projecting portion in the compression step so that the projection is squashed and flattened out to form a flat sheet layer portion. In this case, a flat polymer sheet can be obtained simply by preparing the sheet which has a projecting portion and then heating and rolling it. Moreover, the polymer sheet can be more effectively increased in crystallinity and melting point than the original polymer material. Thus, a polymer sheet having excellent crystallinity and thermal resistance can be provided with ease and at low cost. In addition, the projection is squashed and flattened in the rolling step. Thus, the projection flows into spaces, so that a flat polymer sheet can be formed. Therefore, no bank is formed. Hence, a polymer sheet having a uniform thickness and a large width can be stably obtained.

In obtaining a polymer sheet using the sheet, which has the projecting portion, where Tm is the melting point of the polymer material, the sheet which has the projecting portion is preferably heated to a preheat temperature in the range of (Tm−20° C.) to Tm (° C.) in the heating step and rolled at a temperature in the range of (Tm−25° C.) to (Tm−10° C.) during the roiling. In this case, the crystallinity and melting point of the polymer sheet can be more effectively increased.

The preferred sheet which has the projecting portion to be used is a sheet which has the projecting portion in which the projection is formed of a plurality of projections and the aspect ratio D/H of the projections is within the range of 0.5 to 2 where H is the height of the projections from the surface of the sheet body and D is the dimension of the projections in a direction orthogonal to a direction of extension of the projections. In this case, in the rolling step, the projections can be squashed to flatten them out in spaces between the adjacent projections. Therefore, a flat polymer sheet can be more reliably obtained.

Preferably, the projections has a columnar shape and the dimension D is the diameter of the columnar shape. In this case, in the rolling step, the projections are easily flattened out toward the outside thereof. Therefore, a flat sheet layer portion can be more reliably formed.

A polymer article of the present invention is preferably a polymer article obtained by the above method for producing a polymer article. The polymer article of the present invention is sore preferably a polymer article obtained by the above method for producing a polymer article, wherein polyolefin resin is used as the polymer material and the polymer article is a polyolefin blank or a formed polyolefin body, Polypropylene resin is used as the above polyolefin resin and the polymer article is a polypropylene blank or a formed polypropylene body.

Advantageous Effects of Invention

Since the polymer article of the present invention and a polymer article obtained by the method for producing a polymer article of the present invention are formed of a polymer material and have a crystallinity of not less than 50% but less than 90% and a tensile strain at fracture of not less than 60%, the polymer articles are excellent in mechanical strength, toughness, and stretchability.

Furthermore, when the melting point of the polymer article is the melting point of the polymer material plus 5° C. or above, the thermal resistance of the polymer article can also be increased.

BRIEF DESCRIPTION OF DRAWINGS

FIG. 3(a) is a plan view of a polymer sheet prepared in Example 5 and 3(b) is a schematic front view for illustrating the shape of a sheet which has projecting portions.

DESCRIPTION OF EMBODIMENTS

Hereinafter, a description will be given of details of the present invention.

(Polymer Article)

A polymer article of the present invention is formed by heating and compressing a polymer material. The polymer article of the present invention is a polymer blank or a formed polymer body. The polymer blank can foe used, for example, as a material for obtaining a formed polymer body.

The crystallinity of the polymer article of the present invention is not less than 50% but less than 90%. From the viewpoint of further increasing the mechanical strength of the polymer article, the crystallinity is preferably not less than 60% and preferably not more than 88%. The higher the crystallinity, the more increased the mechanical strength of the polymer article.

The crystallinity is measured in conformity with JIS K 7122. Specifically, the crystallinity is determined by putting the polymer article into a container of a heat flux differential scanning calorimeter, heating it up to 200° C. finding the peat area of a DSC curve, dividing the peak area by 209 mJ/mg, and multiplying the obtained value by 100. For example, "DSC6220" manufactured by SII NanoTechnology Inc. is used as an apparatus for measuring the crystallinity.

The tensile strain at fracture of the polymer article of the present invention at 23° C. is 60% or more. From the viewpoint of further increasing the toughness and stretchability of the polymer article, the tensile strain at fracture is preferably not less than 65% and not more than 300%, and more preferably not more than 250%. The higher the tensile strain, the more increased the toughness and stretchability of the polymer article. The tensile strain refers to the ratio of the difference between the dimension P2 of the polymer article in the stretching direction after being stretched and the dimension P1 of the polymer article in the stretching direction before being stretched to the dimension P1 ((P2−P1)/P1×100).

The tensile strain at fracture is measured in conformity with JIS K 7113. Specifically, the tensile strain at fracture is measured by subjecting the polymer article to a tensile test at 23° C. at a testing speed of a holder of 50 mm/min. For example, "TENSILON Universal Testing Instruments RTC series" manufactured by A&D Company, Limited can be used as apparatuses for measuring the tensile strain.

From the viewpoint of further increasing the rigidity of the polymer article, the tensile elastic modulus of the polymer article of the present invention at 23° C. is preferably not less than 1400 MPa and not more than 20000 MPa. From the viewpoint of further increasing the toughness of the polymer article, the tensile elastic modulus is more preferably not less than 1500 MPa and not more than 15000 MPa.

(Polymer Material)

As described previously, the polymer article of the present invention is obtained by heating and compressing a polymer material. No particular limitation is placed on the form of such a polymer material and the polymer material may have any form, such as a sheet-like shape, various formed articles, or a particulate shape. However, since the polymer material must be able to increase the crystallinity and the melting point by heat application and compression and thereby increase the mechanical strength, it is desirable to use a polymer material having a shape corresponding to a desired shape of the polymer article. For example, in obtaining a sheet-like polymer article of the present invention, a sheet-like polymer material is desirably used.

Although in the present invention a sheet-like polymer material may be used like a final polymer sheet, a sheet which has a projecting portion to be described below is also desirably used.

The sheet which has a projecting portion includes a flat sheet body and a projection formed on one side of the sheet body.

No particular limitation is placed on the thickness of the sheet body. The thickness of the sheet, body can be selected depending upon the thickness of a polymer sheet to be finally obtained. However, in order to roll the sheet body between a pair of rolls in a rolling step, the thickness of the sheet body is preferably not more than about 5 mm. If the thickness of the sheet body is too small, the sheet, body may foe broken during rolling. Therefore, the thickness of the sheet body is preferably not less than 0.05 mm.

Figure 3:
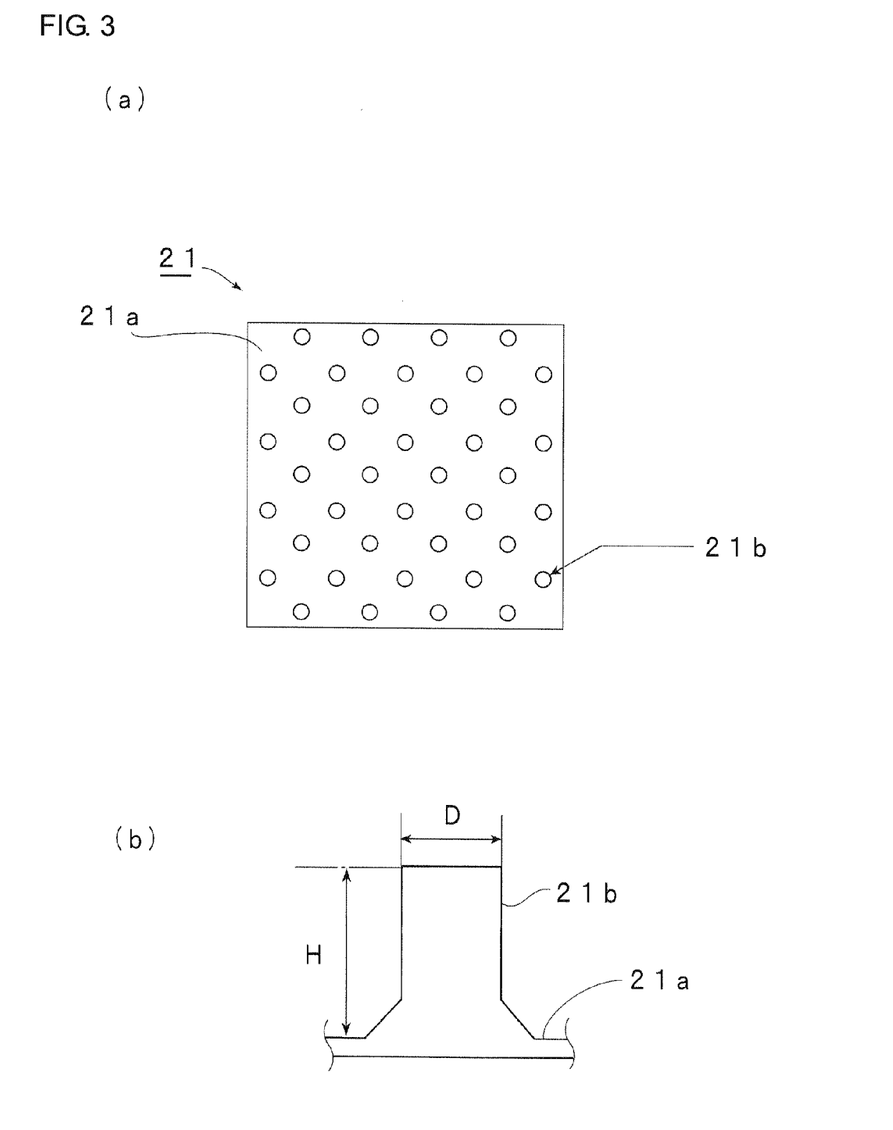

No particular limitation is placed on the shape of the projection. Preferably, as shown in FIGS. 3(a) and 3(b), a projection-bearing sheet 21 having a plurality of projections 21b is used. In the projection-bearing sheet 21, the plurality of projections 21b are arranged in a dispersed manner on one side of the flat sheet body 21a. The projections may have various shapes, such as columnar, prismatic, truncated cone, or truncated pyramid shape. The preferred projections are those which are constant in the direction orthogonal to the direction of extension of the projections all along the extension, such as columnar or prismatic projections. Thus, when the plurality of projections are flattened out in a rolling step, the release between the flattened portions can more reliably occur, so that a flat sheet layer portion can be more reliably formed. More preferably, the projections have a columnar shape. In this case, when the projections are made contact with a roll and thereby squashed, the projections are easily uniformly flattened out in a peripheral direction in plan view. Therefore, a flat sheet layer can be more reliably formed.

Where H is the height of the projections from the surface of the sheet body and D is the dimension of the projections in the direction orthogonal to the height direction of the projections, the aspect ratio D/H thereof needs to be within the range of 0.5 to 2. If the aspect ratio D/H is smaller than 0.5, the crystallinity will not be increased. If the aspect ratio D/H is above 2, the projections will be less likely to be uniformly squashed when rolled, so that the physical properties will vary.

Although the plurality of projections are provided on one side of the sheet body, they are provided so that when rolled, they are squashed and flattened out to form a flat sheet layer portion. Therefore, the plurality of projections are desirably arranged in a uniformly dispersed manner on the one side of the sheet body. However, the pitch and number of the plurality of projections differ depending upon the ease of squash of the polymer material forming the projections in the rolling step, the heating temperature in the rolling step, and the shape and dimensions of the projections. Therefore, the pitch and number of the plurality of projections should be selected so that the projections can be squashed in the roiling step to form a flat sheet layer.

Figure 4:
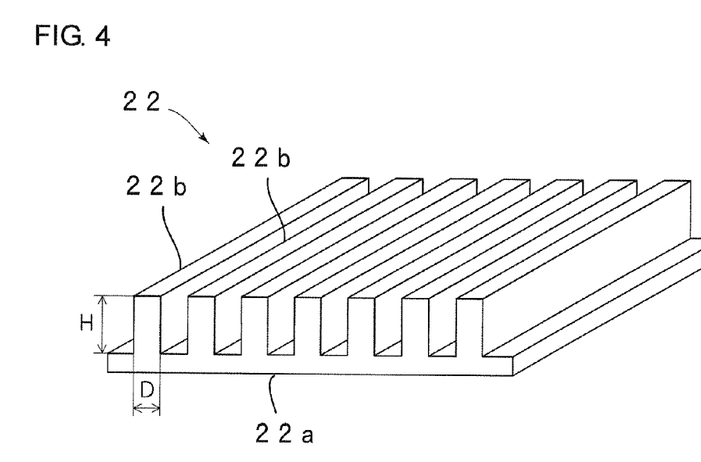
FIG. 4 is a perspective view showing a modification of a sheet which has projecting portions used in the present invention.

Alternatively, as shown in FIG. 4, a plurality of ribs 22b spaced apart from each other may be used as the plurality of projections. In a projection-bearing sheet 22 shown in FIG. 4, the plurality of ribs 22b are arranged in parallel with each other on one side of a flat sheet body 22a. Although the cross-sectional shape of the rib 22b is rectangular in FIG. 4, it can be changed to various shapes, including triangular shapes, trapezium shapes, and shapes having a rib apex of a curve. Furthermore, the plurality of ribs need not necessarily be arranged in parallel with each other.

Also in the structure in which the plurality of ribs 22b are provided, the aspect ratio D/H is desirably within the range of 0.5 to 2 where D is the rib width and H is the rib height.

Figure 5:
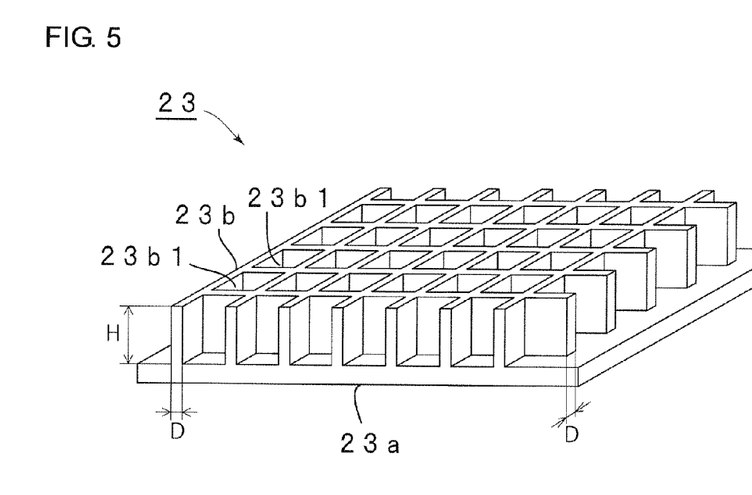
FIG. 5 is a perspective view showing another modification of a sheet which has a projecting portion used in the present invention.

Furthermore, in the present invention, the projection of the sheet which has a projecting portion is not limited to the above projections and projections having a plurality of openings open on the opposite side to the sheet body may be used. In a sheet which has the projecting portion 23 shown in FIG. 5, projections 23b are provided on one side of a flat sheet body 23a. This projection 23 has a plurality of openings 23b1. The openings 23b1 have the shape of a rectangular opening and are provided to extend from the upper surface of the projection 23b to the upper surface of the sheet body 23a. However, the plan shape of the opening 23b1 is not limited to such a rectangular shape and may be other shapes. Therefore, for example, a honeycomb projection having a plurality of openings in the shape of a hexagonal opening may be provided. In the structure provided with the projection 23b, the portions of the projection surrounding each opening 23b1 are flattened out into the opening 23b1 in a rolling step to form a flat sheet portion. In this case, the aspect ratio D/H is preferably within the range of 0.5 to 2 where D is the wall thickness of the projection surrounding the plurality of openings 23b1 and H is the height of the projection.

The polymer article of the present invention preferably has a melting point not lower than the melting point of the above polymer material plus 5° C. This melting point can be found by reading out the peak temperature of the DSC curve described previously. In the polymer article of the present invention, the melting point is preferably not lower than the melting point of the polymer material plus 5° C., in which case the thermal resistance of the polymer article can also be increased.

The polymer material used for the formation of the above polymer is preferably thermoplastic resin. The polymer material has a melting point. The weight average molecular weight of the polymer material is generally 5000 or more and preferably 10000 or more.

Specific examples of the polymer material include polypropylene resin, polyethylene resin, polystyrene resin, polyvinyl chloride resin, polyamide resin, polycarbonate resin, saturated polyester resin, and polymethacrylate ester resin. The above polymer materials may be used singularly or in combination of two or more of them. Because of excellent balance among lightweight, recyclability and cost saving, preferred is polyolefin resin, more preferred is polypropylene resin or polyethylene resin, and even more preferred is polypropylene resin. In particular, with the use of polypropylene resin, the resultant polymer article exhibits very good mechanical strength, toughness, stretchability, and thermal resistance.

Preferably, the polymer article of the present invention is formed of polyolefin resin and is a polyolefin blank or a formed polyolefin body. More preferably, the polymer article of the present invention is formed of polypropylene resin or polyethylene resin and is a polyethylene blank, a formed polyethylene body, a polypropylene blank or a formed polypropylene body. Still more preferably, the polymer article of the present invention is formed of polypropylene resin and is a polypropylene blank or a formed polypropylene body.

Low-density polyethylene is suitably used as the above polyethylene resin. The polyethylene resin is preferably long-chain branched, low-density polyethylene. The polyethylene resin is preferably long-chain branched, low-density polyethylene obtained by radical polymerization in an environment of 1000 to 4000 atmospheres at 200° C. to 300° C. The density of the long-chain branched, low-density polyethylene is about 0.918 to about 0.923 g/cm$^3$. Because of its lightweight and excellent formability, long-chain branched polyethylene-based resin is most preferred. A single kind of polyethylene resin may be used or two or more kinds of polyethylene resin may foe used in combination.

Examples of the polyethylene resin include homopolyethylene and copolymers of ethylene and one or more other monomers. In the case of copolymers of ethylene and one or more other monomers, ethylene is used as a main component. For example, ethylene is used at a concentration of 50% by weight or more in monomers of 100% by weight in total for obtaining an ethylene-α-olefin copolymer. Of these, random polyethylene is suitably used.

Examples of the copolymers of ethylene and one or more other monomers include ethylene-α-olefin copolymers. No particular limitation is placed on the form of copolymerization of the copolymer of ethylene and one or more other monomers. The copolymer of ethylene and one or more other monomers may be a block copolymer, a random copolymer or a random-block copolymer.

Examples of the polypropylene resin include homopolypropylene and copolymers of propylene and one or more other monomers. In the case of copolymers of propylene and one or more other monomers, propylene is used as a main component. For example, propylene is used at a concentration of 50% by weight or more in monomers of 100% by weight in total for obtaining a propylene-α-olefin copolymer. Of these, random polypropylene is suitably used. A single kind of polypropylene resin may be used or two or more kinds of polypropylene resin may be used in combination.

Examples of the copolymers of propylene and one or more other monomers include propylene-α-olefin copolymers. No particular limitation is placed on the form of copolymerization of the copolymer of propylene and one or more other monomers. The copolymer of propylene and one or more other monomers may be a block copolymer, a random copolymer or a random-block copolymer.

Examples of the α-olefin in the ethylene-α-olefin copolymer and the propylene-α-olefin copolymer include ethylene, 1-butene, 1-pentene, 1-hexene, 4-methyl-1-pentene, 1-heptene, and 1-octene. The content of α-olefin in monomers of 100% by weight in total for obtaining the ethylene-α-olefin copolymer or the propylene-α-olefin copolymer is preferably not less than 1% by weight and more preferably not less than 2% by weight, and preferably not more than 8% by weight and more preferably not more than 5% by weight. When the content of α-olefin is not more than the above upper limit, the appearance of the polymer article can be further improved. When the content of α-olefin is not less than the above lower limit, the mechanical strength and toughness of the polymer article can be further increased.

(Production Method of Polymer Article)

No particular limitation is placed on the production method for obtaining the polymer article of the present invention. For example, any one of injection molding, roll process following extrusion molding, rolling, and pressing can be applied as the production method.

A method for producing a polymer article of the present invention is a method for producing a polymer article, which is a polymer blank or a formed polymer body, using the polymer material described above. The method for producing a polymer article of the present invention includes a heating step of heating the polymer material to a temperature of not lower than (Tm−70)° C. but lower than Tm where Tm is the melting point (° C.) of the polymer material; and a compression step of cooling the polymer material heated in the heating step and compressing the polymer material in the course of the cooling to obtain a polymer article having a crystallinity of not less than 50% but less than 90% and a tensile strain at fracture of not less than 60%.

Preferably, in the heating step, the polymer material is heated to a temperature of not lower than (Tm−15)° C. but lower than (Tm−5)° C. Thus, through the compression step, a polymer article can be obtained which has a crystallinity of not less than 50% but less than 90%, a tensile strain at fracture of not less than 60%, and a melting point not lower than the melting point of the polymer material plus 5° C. Therefore, the thermal resistance of the resultant polymer article can also be increased.

Figure 1:
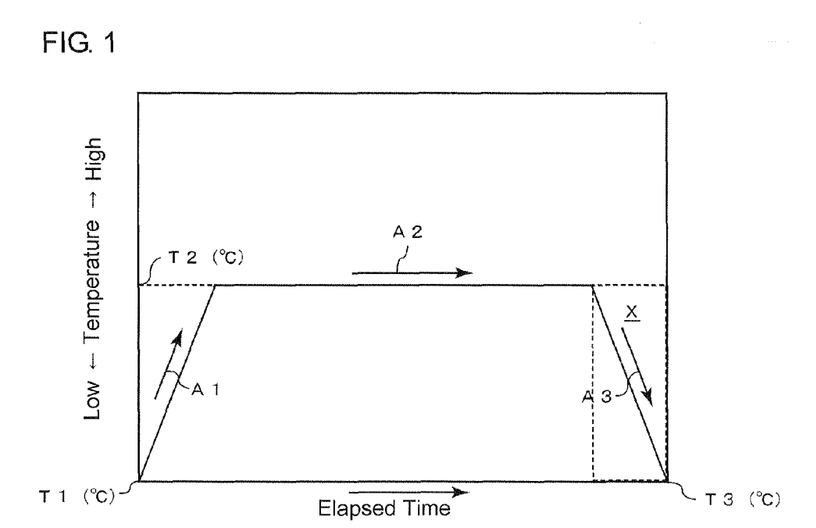
FIG. 1 is a graph for illustrating the relationship between elapsed time and temperature of a polymer material in a method for producing a polymer article of one embodiment of the present invention.

FIG. 1 shows an example of relationship between elapsed time and temperature of the polymer material in each step for obtaining a polymer article. First, as shown by the arrow A1, the polymer material at the temperature T1 (° C.) shown in FIG. 1 is heated to the temperature T2 (° C.) shown in FIG. 1 (heating step). The temperature T1 is generally an ordinary temperature and about 23° C. The temperature T2 is not lower than (Tm−70)° C. but lower than Tm, and preferably not lower than (Tm−15)° C. but lower than (Tm−5)° C. No particular limitation is placed on the heating rate but it is about 10° C. to 120° C. per minute.

Next, as shown by the arrow A2, the heated polymer material may be held at the temperature T2 for a certain time. The standard of the time for holding the heated polymer material at the temperature T2 is about 30 seconds to about 15 minutes.

However, the heated polymer material may be cooled promptly after the heating. For example, the polymer material may be cooled before 30 seconds after the heating.

Thereafter, as shown by the arrow A3, the polymer material heated to the temperature T2 (° C.) is cooled to the temperature T3 (° C.) shown in FIG. 1. The temperature T3 is generally an ordinary temperature and about 23° C. No particular limitation is placed on the cooling rate but it is about 5° C. to about 100° C. per minute. In this course of cooling, i.e., within the region X enclosed by the dash lines shown in FIG. 1, the polymer material heated to the above specific temperature is compressed (compression step). By the compression, the polymer material is aligned in polymer orientation to increase the crystallinity. The compressed polymer material compressively deforms.

It is preferred that in the compression step the heated polymer material be cooled and the polymer material be compressed at 110° C. or above in the course of the cooling. Thus, a polymer article can be obtained which is more excellent in mechanical strength, toughness, and stretchability. The temperature of the polymer material during compression is preferably not higher than (Tm−5)° C. and more preferably not higher than (Tm−7.5)° C.

No particular limitation is placed on the conditions of compression of the polymer material. The polymer material is preferably compressed by a hydraulic pressure of a pressing machine. The compression may be performed at a time, or several. Note that in the present invention the compression in the course of cooling includes the case where compression follows an interruption of the cooling. In other words, after the cooling is interrupted, the compression may be performed, followed by restart of the cooling.

From the viewpoint of further increasing the mechanical strength, toughness, and stretchability of the polymer article, the ratio of the difference between the thickness T2 (mm) of the polymer article after the compression and the thickness T1 (mm) of the polymer material before the compression to the thickness T1 ((T2−T1)/T1), which is hereinafter also referred to as the compressibility, is preferably 0.5 to 0.98, both inclusive. In the compression step, the heated polymer material is preferably compressed so that the compressibility is 0.5 to 0.98, both inclusive. From the viewpoint of still further increasing the mechanical strength, toughness, and stretchability of the polymer article, the compressibility is more preferably 0.66 to 0.95, both inclusive.

A principal feature of the method for producing a polymer article of the present invention is to heat the polymer material to a temperature of not lower than (Tm−70)° C. but lower than Tm and preferably not lower than (Tm−15)° C. but lower than (Tm−5)° C. and compress the heated polymer material in the course of the cooling. Thus, a polymer article can be obtained which has a crystallinity of not less than 50% but less than 90%, a tensile strain at fracture of not less than 60%, and preferably a melting point not lower than the melting point of the polymer material plus 5° C. In addition, the resultant polymer article exhibits good mechanical strength, toughness, and stretchability.

Furthermore, if in the heating step the polymer material is heated within a preferred heating temperature range of not lower than (Tm−15)° C. but lower than (Tm−5)° C., a polymer article can be provided which is excellent also in thermal resistance as described above.

In addition, the transparency of the resultant polymer article is also increased. Moreover, in the case of the polymer article obtained by the method for producing a polymer article of the present invention, even if the polymer article is once bent so that the bent portion is clouded and the polymer article is then bent back, the portion can easily return to transparent.

Specific examples of the method for producing a polymer article of the present invention are the following production methods.

In the case of using injection molding, a polymer material is heated, the heated polymer material is injected and charged into a mold including a stationary mold half and a movable mold half capable of moving close to and away from the stationary mold half. After a predetermined time has passed, the heated polymer material is cooled. In the course of cooling, the polymer material is compressed. Thereafter, the polymer material is well cooled to solidify, thereby obtaining a polymer article.

In the case of using pressing, a polymer material is heated and after a predetermined time has passed, the heated polymer material is cooled. In the course of cooling, the polymer material is compressed by a pressing apparatus. Thereafter, the polymer material is well cooled to solidify, thereby obtaining a polymer article.

Figure 2:
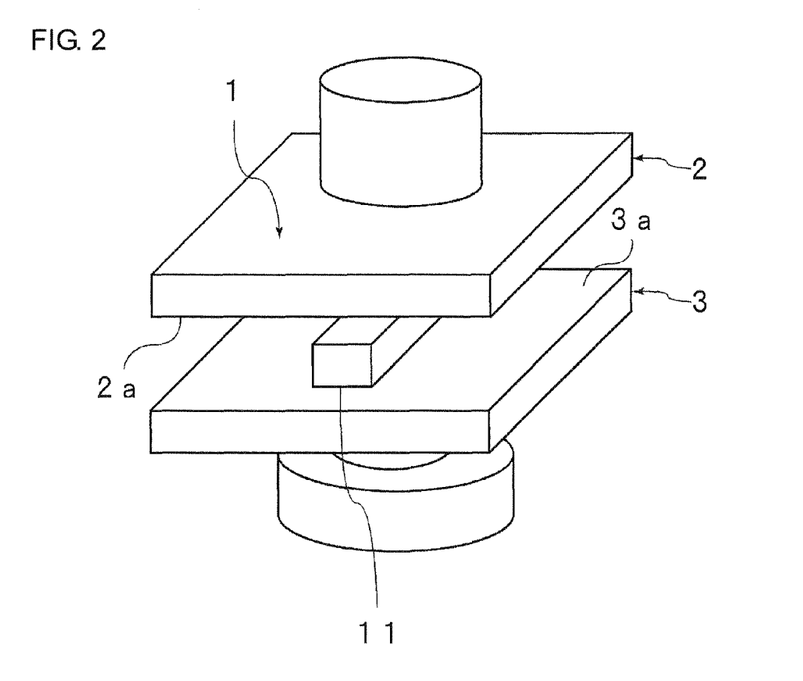
FIG. 2 is a schematic perspective view for illustrating the step of compressing a polymer article using a pressing apparatus.

In the pressing, a pressing apparatus shown in FIG. 2, for example, can be used. The pressing apparatus 1 shown in FIG. 2 includes a first die 2 located on the upper side and a second die 3 located on the lower side. A heated polymer material 11 can be compressed by the bottom surface 2a of the first die 2 and the top surface 3a of the second die 3. In the pressing apparatus 1, the second die 3 is moved up to compress the heated polymer material 11, so that the polymer material 11 can have a predetermined thickness. Furthermore, in the pressing apparatus 1, the pressure during compression of the polymer material 11 can be arbitrarily selected.

Note that a polymer article may be obtained using a composition in which a polymer material is doped with other components such as, for example, those conventionally used in obtaining a polymer article.

(Polymer Sheet Production Method Using Sheet which has a Projecting Portion)

1) Preheating Step

In a production method of a polymer sheet using the sheet which has the projecting portion described previously as a polymer material, the sheet which has projecting portions is heated prior to rolling. Specifically, prior to rolling, the polymer material is preheated in a heating step, in relation to the heating temperature, the polymer material is preferably heated at or below Tm (° C.) where Tm is the melting point of the polymer material. If the polymer material is heated to a temperature above Tm, it will melt to make it difficult to retain the shape of the projection, resulting in failure in achieving a desired crystallinity. On the other hand, if the heating temperature in the heating step is too low, this may make it impossible to reliably squash a plurality of projections upon rolling to form a flat sheet layer. Therefore, the heating temperature is preferably not lower than (Tm−20)° C.

Note that herein the melting points and crystallinities of the polymer material and polymer sheet are values determined based on peak temperatures obtained by DSC measurement.

No particular limitation is placed on the heating method and any appropriate method can be used, such as a method, in which a sheet which has a projecting portion is conveyed while being brought into contact with a heating roll, a method in which a sheet which has a projecting portion is passed through the inside of a heating apparatus prior to roiling, or a method in which a blow of hot gas is applied to a sheet which has projecting portions.

The above temperature of preheat in the heating step refers to a temperature immediately before the polymer material is made contact with rolls described later upon rolling. In other words, the projection-bearing sheet should be heated so that the temperature thereof immediately before being subjected, to a roiling step fail within the above specific heating temperature range.

2) Rolling Step

Subsequent to the heating step, the sheet which has the projecting portion is rolled in a compression step to obtain a polymer sheet. This rolling is performed so that the projection is squashed and flattened out to form a flat sheet layer portion. Specifically, the clearance between a pair of pressure rolls is previously set to be smaller than the thickness of the sheet which has the projecting portion to be fed including the thickness of the projection and the sheet which has the projecting portion is then rolled by feeding it between the pair of pressure roils.

The thickness of the sheet body may be smaller than the clearance between the pair of pressure rolls. In other words, in the production method of the present invention, the rolling step is performed not for the purpose of reducing the thickness of the sheet body itself but for the purpose of squashing the projection to form a flat sheet layer portion. Therefore, the clearance between the pressure roils may be greater than the thickness of the sheet body.

Furthermore, the size of the clearance should be equal to or slightly smaller than the sum of the thickness of a flat sheet layer portion formed by squashing the projection and the thickness of the sheet body. Thus, a flat sheet layer portion can be reliably formed and, therefore, a flat polymer sheet can be obtained. This size of the clearance can be set in consideration of the shape and size of the projection and, for example, the pitch, number or the like of the plurality of projections. Specifically, where $S_0$ is the unit area of the sheet body and V is the total volume of portions of the projection existing in unit area $S_0$, a sheet layer portion having a thickness $t=V/S_0$ at the maximum will be formed, although it depends upon the roiling magnification. Therefore, where to is the thickness of the sheet body, the clearance should be equal to or slightly smaller than $t_0+t$.

The temperature during the rolling may be any temperature unless the sheet which has projecting portion will melt and, therefore, it may be any temperature not higher than Tm. Preferably, the rolling is performed at a temperature in the range of (Tm−25° C.) to (Tm−10° C.). When the rolling is performed at a temperature in this range, the projections can be reliably softened and squashed, so that a flat sheet layer portion can be more reliably formed.

The rolling step can be performed by feeding the projection-bearing sheet to between the pair of pressure rolls according to a well-known method for roiling a polymer resin sheet. The present invention does not take the measure of bringing a molten resin into contact with the roils but takes the measure of bringing the preheated, or unmelted sheet which has projecting portions into contact with the rolls as described above. Therefore, no bank is formed. Hence, even if a wide polymer sheet is desired to be obtained, a wide sheet having a uniform thickness can be reliably and stably obtained.

Furthermore, in the present invention, as is obvious from experimental examples to be described later, the sheet includes a flat sheet layer portion formed by squashing and flattening the projections in the rolling step, so that the resultant polymer sheet can be significantly increased in crystallinity and melting point than the original polymer material. Therefore, a polymer sheet having excellent crystallinity and thermal resistance can be provided using an inexpensive commodity resin.

Note that in producing a polymer sheet using the above sheet which has projecting portions, a single sheet which has projecting portions may be used or a plurality of sheets which have projecting portions may be laminated together. In other words, a polymer sheet may be obtained by heating the plurality of stacked sheets which have projecting portions and then rolling them. In this case, a thick, flat polymer sheet can foe stably obtained.

3) Polymer Sheet

As described above, the projection is squashed and flattened out in the roiling step, so that a flat sheet layer portion is formed. Therefore, the resultant polymer sheet can be increased in melting point and crystallinity as compared with the projection-bearing sheet which is an original polymer material. Hence, the polymer sheet of the present invention can 3 be suitably used as a resin material for electronic components which will be exposed to nigh temperatures when used at high temperatures or upon packaging.

Although no particular limitation is placed on the applications of the polymer article obtained in the above manner, it can be applied to housings such as in information equipment including personal computers, home electric appliances, and office automation equipment, interior automotive trim, and the like. The polymer article may foe used to the other applications.

Hereinafter, the present invention will be described in detail with examples and comparative examples. However, the present invention is not limited only to the following examples.

Example 1

Polypropylene resin (polypropylene resin Grade MA3H having a melting point of 170° C., manufactured by Japan Polypropylene Corporation) was injection molded into a size of 8.0 mm by 12.0 mm by 3.0 mm in thickness T1 to obtain a molded product as a polymer material.

The obtained molded product was heated from an ordinary temperature (23° C.) to 150° C. in an oven and put on the top surface 3a of the second die 3 of the pressing apparatus 1 shown in FIG. 2. Thereafter, the polymer product heated to 150° C. was cooled at a rate of temperature drop of 10° C./min, the second die 3 was then moved up when the temperature of the polymer product was 145° C., the polymer product before being compressed was compressed by a hydraulic pressure between the bottom surface of the first die and the top surface of the second die until the thickness T2 reached 0.8 mm (i.e., the ratio (compressibility) (T1−T2)/T1=0.73), and the polymer product was then cooled to the ordinary temperature (23° C.) to obtain a polymer article.

Example 2

A polymer article was obtained in the same manner as in Example 1 except that the molded product before being compressed was compressed until the thickness T2 reached 0.6 mm (i.e., the ratio (compressibility) (T1−T2)/T1=0.8).

Example 3

Polypropylene resin (polypropylene resin Grade MA3H having a melting point of 170° C., manufactured by Japan Polypropylene Corporation) was injection molded into a size of 8.0 mm by 12.0 mm by 3.0 mm in thickness T1 to obtain a molded product as a polymer material.

The obtained molded product was heated from an ordinary temperature (23° C.) to 160° C. in an oven and put on the top surface 3a of the second die 3 of the pressing apparatus 1 shown in FIG. 2. Thereafter, the polymer product heated to 160° C. was cooled at a rate of temperature drop of 10° C./min, the second die 3 was then moved up when the temperature of the polymer product was 155° C., the polymer product before being compressed was compressed by a hydraulic pressure between the bottom surface of the first die and the top surface of the second die until the thickness T2 reached 0.6 mm (i.e., the ratio (compressibility) (T2−T1)/T1=0.8), and the polymer product was then cooled to the ordinary temperature (23° C.) to obtain a polymer article.

Polypropylene resin (polypropylene resin Grade MA3H having a melting point of 170° C., manufactured by Japan Polypropylene Corporation) was injection molded into a size of 8.0 mm by 12.0 mm by 0.75 mm in thickness to obtain a polymer product.

Example 4

A polymer article was obtained in the same conditions as in Example 3, except that the polymer product before being compressed was compressed by a hydraulic pressure until the thickness T2 reached 0.8 mm (i.e., the ratio (compressibility) (T2−T1)/T1=0.73) and the polymer product was then cooled to the ordinary temperature (23° C.).

Comparative Example 1

Polypropylene resin (polypropylene resin Grade MA3H having a melting point of 170° C., manufactured by Japan Polypropylene Corporation) was injection molded into a size of 8.0 mm by 12.0 mm by 0.75 mm in thickness to obtain a polymer article.

(Evaluation)
(1) Crystallinity and Melting Point

The crystallinity is measured in conformity with JIS K 7122. Specifically, the crystallinity is determined by putting the polymer article into a container of a heat flux differential scanning calorimeter, heating it up to 200° C., finding the peak area of a DSC curve, dividing the peak area by 209 mJ/mg, and multiplying the obtained value by 100. For example, "DSC6220" manufactured by SII NanoTechnology Inc. is used as an apparatus for measuring the crystallinity. The melting point of the thermoplastic resin is a melting point determined by a melting peak measured by DSC (differential scanning calorimetry).

(2) Tensile Strain at Fracture

The tensile strain of each obtained polymer article upon fracture was measured by subjecting it to a tensile test at 23° C. at a test rate of 50 mm/min in conformity with JIS K 7113. One of "TENSILON Universal Testing Instruments RTC series" manufactured by A&D Company, Limited was used as an apparatus for measuring the tensile strain.

(3) Tensile Elastic Modulus

The tensile elastic modulus of each obtained polymer article was measured by subjecting it to a tensile test at 23° C. at a test rate of 50 mm/rain. One of "TENSILON Universal Testing Instruments RTC series" manufactured by A&D Company, Limited was used as an apparatus for measuring the tensile elastic modulus.

TABLE 1

|  | Ex. 1 | Ex. 2 | Ex. 3 | Ex. 4 | Comp. Ex. 1 |
| --- | --- | --- | --- | --- | --- |
| Compressibility | 0.73 | 0.8 | 0.8 | 0.73 | — |
| Crystallinity (%) | 57 | 56 | 61 | 58 | 47 |

TABLE 1-continued

|  | Ex. 1 | Ex. 2 | Ex. 3 | Ex. 4 | Comp. Ex. 1 |
| --- | --- | --- | --- | --- | --- |
| Tensile Strain at Fracture (%) | 71 | 180 | 69 | 60 | 27 |
| Tensile Elastic Modulus (MPa) | 1606 | 1613 | 1596 | 1523 | 1052 |
| Melting Point (° C.) | 170 | 169 | 177 | 177 | 168 |

The crystallinities and melting points of polymer sheets obtained in the following Examples 5 and 6 and Comparative Examples 2 to 8 were determined in the same manner as the method for measuring the crystallinity and the melting point in the evaluation of Example 1.

Examples 5-6 and Comparative Examples 2-8 Using Projection-Bearing Sheet

Example 5

A projection-bearing sheet 11 shown in FIG. 3(a) was obtained by press forming using polypropylene (polypropylene Grade MA3H having a melting point of 170° C., manufactured by Japan Polypropylene Corporation). In this projection-bearing sheet 11, the thickness of the sheet body 11a was 0.1 mm. Furthermore, as shown in FIG. 3(b), the height H of the projections 11b was 5 mm, the diameter D thereof was 4 mm, and the aspect ratio D/H thereof was 0.8. Moreover, the pitch of the plurality of projections 11b was 31.1 mm.

The projection-bearing sheet was sandwiched between a pair of polyimide films with a thickness of 0.05 mm and they were fed and rolled at a preheat temperature of 160° C. between a pair of pressure rolls. The rolling temperature was 150° C. and the line speed was 20 m/min. In the above manner, a 0.5 mm-thick and 300 mm-wide polymer sheet was obtained.

The thickness accuracy was ±2.7%.

The crystallinity was 58% and the melting point was 176.0° C.

Example 6

A 0.5 mm-thick and 300 mm-wide polymer sheet was obtained in the same manner as in Example 5 except that the preheat temperature was 155° C.

The thickness accuracy was ±2.4%.

The crystallinity was 56% and the melting point was 174.0° C.

Comparative Example 2

The same polypropylene as used in Example 5 (polypropylene Grade MA3H having a melting point of 170° C., manufactured by Japan Polypropylene Corporation) was formed into a sheet by injection molding to obtain a 5 mm-thick polymer sheet.

The crystallinity was 47.7% and the melting point was 167.7° C.

Comparative Example 3

A 0.18 mm-thick sheet was obtained by forming a sheet in the same manner as in Example 5 except that the height H was 1 mm, the diameter D was 4 mm, and the aspect ratio D/H was 0.25. The crystallinity was 48.5% and the melting point was 168.3° C.

Comparative Example 4

A 0.9 mm-thick sheet having nonuniform transparency was obtained by forming a sheet in the same manner as in Example 5 except that the height H was 10 mm, the diameter D was 4 mm, and the aspect ratio D/H was 2.5. As a result of evaluation of the sheet at two points having different transparencies, the crystallinity and melting point at one point were 50.0% and 167.1° C., respectively, while the crystallinity and melting point at the other point were 56.0% and 173.5° C., respectively.

Comparative Example 5

An attempt to form a sheet was made in the same manner as in Example 5 except that the preheat temperature was 140° C. but the projections were nonuniformly squashed to fail to form a uniform sheet.

Comparative Example 6

An attempt to form a sheet was made in the same manner as in Example 5 except that the preheat temperature was 175° C. The crystallinity was 49% and the melting point was 167.7° C.

Comparative Example 7

An attempt to form a sheet was made in the same manner as in Example 5 except that the rolling temperature was 135° C., but the projections were nonuniformly squashed to fail to form a uniform sheet.

Comparative Example 8

An attempt to form a sheet was made in the same manner as in Example 5 except that the rolling temperature was 175° C. The crystallinity was 49% and the melting point was 168.7° C.

It can be seen that Examples 5 and 6 can significantly increase the melting point and crystallinity as compared with those of Comparative Examples 2 to 8, i.e., those of the original polypropylene.

REFERENCE SIGNS LIST

1 . . . pressing apparatus
2 . . . first die
2a . . . bottom surface
3 . . . second die
3a . . . top surface
11 . . . polymer material
21 . . . projection-bearing sheet
21a . . . sheet body
21b . . . projection
22 . . . projection-bearing sheet
22a . . . sheet body
22b . . . rib
23 . . . sheet which has projecting portions
23a . . . sheet body
23b . . . projections
23b1 . . . opening

The invention claimed is:

1. A method for producing, a polymer article, which is a polymer blank or a formed polymer body, using a polymer material, the method comprising:
    a heating step of heating a polymer molding product, which is formed of the polymer material and has a shape corresponding to a desired shape of the polymer article, to a temperature of not lower than (Tm−70)° C. but lower than (Tm)° C. where Tm is the melting point (° C.) of the polymer material; and
    a compression step of cooling the polymer molding product heated in the heating step and compressing the polymer molding product in the course of the cooling to obtain the polymer article, the polymer article having a crystallinity of not less than 50% but less than 90% and as tensile strain at fracture of not less than 60%.

2. The method for producing a polymer article according to claim 1, wherein in the heating step the polymer material is heated to a temperature of not lower than (Tm−15)° C. but lower than (Tm−5)° C., and through the compression step, a polymer article is obtained which has a crystallinity of not less than 50% but less than 90%, a tensile strain at fracture of not less than 60%, and a melting point not lower than the melting, point of the polymer material plus 5° C.

3. The method for producing a polymer article according to claim 1, wherein in the compression step the polymer material is compressed so that the ratio of the difference between the thickness of the polymer article obtained after the compression and the thickness of the polymer material before the compression to the thickness of the polymer material before the compression is 0.5 to 0.98, both inclusive.

4. The method for producing a polymer article according to claim 1, wherein in the course of the cooling during the compression step, the polymer material is compressed at a temperature of 110° C. or above and less than the temperature of the heating step.

5. The method for producing a polymer article according to claim 1, wherein
    the polymer material is a sheet which has a projecting portion, the sheet of which has projecting portions including a sheet body and projections formed on one side of the sheet body, and
    a polymer sheet is obtained as the polymer article by heating the sheet which has projecting portions in the heating step and then rolling the sheet which has projecting portions in the compression step so that the projections are squashed and flattened out to form a flat sheet layer portion.

6. The method for producing a polymer article according to claim 5, wherein where Tm is the melting point of the polymer material, the sheet which has projecting portions is heated to a preheat temperature in the range of (Tm−20° C.) up to but lower than Tm(° C.) in the heating step and rolled at a temperature in the range of (Tm−25° C.) to (Tm−10° C.) during the rolling.

7. The method for producing a polymer article according to claim 5, wherein the projections comprise a plurality of projections and the aspect ratio D/H of the projections is within the range of 0.5 to 2 where H is the height of the projections from the surface of the sheet body and D is the dimension of the projections in a direction orthogonal to a direction of extension of the projections.

8. The method for producing a polymer article according to claim 5, wherein the projections has a columnar shape and the dimension D is the diameter of the columnar shape.

9. The method for producing a polymer article according to claim 1, wherein polyolefin resin is used as the polymer material to produce a polymer article which is a polyolefin blank or a formed polyolefin body.

10. The method for producing a polymer article according to claim 9, wherein polypropylene resin is used as the polymer material to produce a polymer article which is a polypropylene blank or a formed polypropylene body.

11. The method for producing a polymer article according to claim 2, wherein in the compression step the polymer material is compressed so that the ratio of the difference between the thickness of the polymer article obtained after the compression and the thickness of the polymer material before the compression to the thickness of the polymer material before the compression is 0.5 to 0.98, both inclusive.

12. The method for producing a polymer article according to claim 2, wherein in the course of the cooling during, the compression step, the polymer material is compressed at a temperature of 110° C. or above and less than the temperature of the heating step.

13. The method for producing a polymer article according to claim 6, wherein the projections comprise a plurality of projections and the aspect ratio D/H of the projections is within the range of 0.5 to 2 where H is the height of the projections from the surface of the sheet body and D is the dimension of the projections in a direction orthogonal to a direction of extension of the projections.

14. The method for producing a polymer article according to claim 6, wherein the projections has a columnar shape and the dimension D is the diameter of the columnar shape.

* * * * *